United States Patent
Richter et al.

(10) Patent No.: US 8,584,357 B2
(45) Date of Patent: Nov. 19, 2013

(54) DEVICE AND METHOD FOR THE REPAIR OR PRODUCTION OF BLADE TIPS OF BLADES OF A GAS TURBINE, IN PARTICULAR OF AN AIRCRAFT ENGINE

(75) Inventors: Karl-Hermann Richter, Markt Indersdorf (DE); Herbert Hanrieder, Hohenkammer (DE); Christoph Ader, Munich (DE); Christoph Over, Aachen (DE)

(73) Assignee: MTU Aero Engines AG, Munich (DE)

( * ) Notice: Subject to any disclaimer, the term of this patent is extended or adjusted under 35 U.S.C. 154(b) by 970 days.

(21) Appl. No.: 12/519,117

(22) PCT Filed: Dec. 5, 2007

(86) PCT No.: PCT/DE2007/002199
§ 371 (c)(1), (2), (4) Date: Jan. 25, 2010

(87) PCT Pub. No.: WO2008/071165
PCT Pub. Date: Jun. 19, 2008

(65) Prior Publication Data
US 2010/0151145 A1    Jun. 17, 2010

(30) Foreign Application Priority Data

Dec. 14, 2006 (DE) .......... 10 2006 058 949

(51) Int. Cl.
*B21D 53/78* (2006.01)

(52) U.S. Cl.
USPC ................................ 29/889.7; 29/889.1

(58) Field of Classification Search
USPC ............ 29/889, 889.1, 889.2, 889.7, 889.71, 29/889.72; 427/543
See application file for complete search history.

(56) References Cited

U.S. PATENT DOCUMENTS

| 4,818,562 A | * | 4/1989 | Arcella et al. ................. 427/597 |
| 4,851,188 A | | 7/1989 | Schaefer et al. |
| 2001/0014403 A1 | | 8/2001 | Brown et al. |

FOREIGN PATENT DOCUMENTS

DE    199 03 436 A1    8/2000

OTHER PUBLICATIONS

Machine Translation DE19903436A1, Inventor: Steffen, Jul. 1989.*
PCT/DE2007/002199, International Search Report and Written Opinion, Apr. 16, 2008.

* cited by examiner

*Primary Examiner* — David Bryant
*Assistant Examiner* — Ryan J Walters
(74) *Attorney, Agent, or Firm* — Howison & Arnott, L.L.P.

(57) ABSTRACT

The invention relates to a device for the production or repair of a blade for a gas turbine, said device comprising: a holding device for holding a blade or an aerofoil of a blade; a lowering mechanism for lowering the blade or the aerofoil; a container for receiving power and/or for receiving the blade or the aerofoil; a heating device; and a radiation source, wherein the heating device is formed as an induction coil.

6 Claims, 1 Drawing Sheet

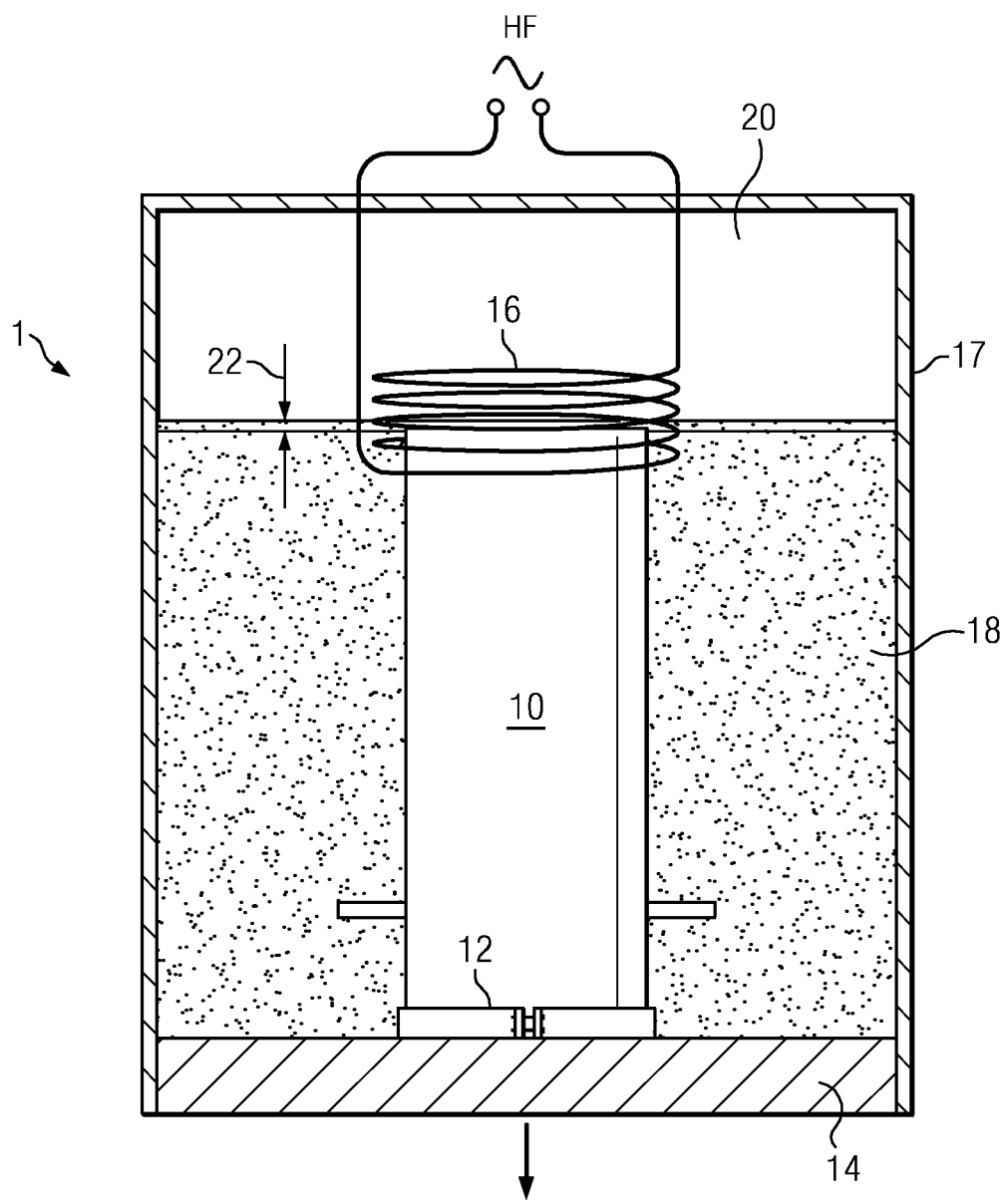

DEVICE AND METHOD FOR THE REPAIR OR PRODUCTION OF BLADE TIPS OF BLADES OF A GAS TURBINE, IN PARTICULAR OF AN AIRCRAFT ENGINE

CROSS-REFERENCE TO RELATED APPLICATIONS

This application is a U.S. National Phase application submitted under 35 U.S.C. §371 of Patent Cooperation Treaty application serial no. PCT/DE2007/002199, filed Dec. 5, 2007, and entitled DEVICE AND METHOD FOR THE REPAIR OR PRODUCTION OF BLADE TIPS OF BLADES OF A GAS TURBINE, IN PARTICULAR OF AN AIRCRAFT ENGINE, which application claims priority to German patent application serial no. DE 10 2006 058 949.1, filed Dec. 14, 2006, and entitled VORRICHTUNG UND VERFAHREN ZUR REPARATUR ODER HERSTELLUNG VON SCHAUFELSPITZEN VON SCHAUFELN EWER GASTURBINE, INSBESONDERE EINES FLUGTRIEBWERKS, the specifications of which are incorporated herein by reference in their entireties.

TECHNICAL FIELD

The invention relates to a procedure for repair or manufacture of tips of blades of a gas turbine, especially of an aircraft engine, as well as a device for the repair or manufacture of tips of blades of a gas turbine, especially of an aircraft engine.

BACKGROUND

Since blades of aircraft engines, such as turbine blades or compressor blades, are quite expensive to manufacture, such blades as a rule are repaired, if this is possible, in cases of damage or wear. Thus, a damaged or worn blade is not always replaced by a new one, but rather only if it is unavoidable.

So-called "patching" as a rule is used for repair of blades at present. To do so, via a cut, a part of a blade in which a damaged section is found is removed from the blade. Often this affects a section that contains the blade tip, because it is precisely in the area of the tip that damage or wear often appears. However, patching can also be done by means of standardized cuts.

Then, onto the severed segment of the blade, a new segment of identical form becomes the replacement. As a rule this occurs so that the new segment—if necessary still with some excess—is produced separately and fitted onto the remainder of the blade. Especially in cases in which the new segment has an excess, it is then processed, by which the target shape is generated.

This known procedure for blade repair, which typically is done manually, involves relatively high expense.

From other technical fields, thus not from the field of blade repairs, in other respects, so-called generative procedures are known. With these generative procedures, a component is assembled out of powder in layers, in that these individual layers are solidified under thermal action in combination with radiation energy. For reducing the thermal gradient in combination with crack formation, a (powder) layer can be provided with overall heating. With such supplementary heating or generative manufacturing procedures, two versions exist.

The one version involves use of an electrical heating plate with layered generative production. This is such that by means of a heating plate, the (metallic) component, including the initial material (powder) to be fabricated is heated, so that by means of this component (through thermal conductance) the area in which the next layer is to be applied is brought to a temperature necessary to melt the powder.

The second version is such that the operational space in which the generative manufacturing procedure is carried out is itself an oven. In other words, thus the component is generatively produced in an oven. The oven produces an even (high) temperature that is required to assemble the layer in question, and in the process necessarily heats the entire component to be assembled or shaped.

Specialists are in agreement that such generative manufacturing procedures can be used only to a limited degree and for quite limited purposes of use, but then have substantial disadvantages.

Thus, according to unanimous opinion in specialist circles, generative manufacturing procedures are considered to be totally unsuited when a danger exists that a large-area heating of the component or the component to be produced leads to substantial joint alterations and/or warping, and thus to considerable manufacturing imprecision.

A typical field of the type named previously, thus the type in which generative manufacturing is considered as totally unsuited for this field, is the field of blade repair for turbines or compressors of aircraft engines.

In other respects an additional difficulty in this specialty field is that blades that are distorted in uneven fashion as compared to each other, and in which the same rotors are used, can result in the rotor having considerable inhomogeneities in rotating. This would not only lead to a considerable increase in fuel consumption, but in addition, could possibly even be the cause of situations critical for safety.

With this as background, the task that is the basis for the invention is to provide a simple possibility of repairing blades or tips of blades for turbines or compressors of aircraft engines.

SUMMARY

To solve this, a device is proposed for repair or manufacture of blades, especially of blade tips, of a gas turbine, whereby this device has: a holding device for holding blade or a sheet of a blade (i.e., aerofoil); a lowering device for lowering the blade or the blade sheet; a container for accommodating power and/or for accommodating the blade or the blade sheet; a heater; and a radiation source; characterized in that the heater is configured as an induction coil. An invention-specific procedure configured so that at least one section of the blade or of the sheet (i.e., aerofoil) of this blade is generatively produced in layers, comprising the following steps: application of a base body; locally limited, direct or indirect inductive heating of the base body or of an area of the base body to a temperature that is greater than a preset minimum temperature; and irradiation in the are of the power layer covering the preset section of the base body for local fusing of the power layer with the base body. Preferred additional embodiments are the subjects of the subordinate claims.

Thus, what is particularly proposed is a device for manufacture or repair of a gas turbine blade, especially a compressor blade or turbine blade. In an advantageous embodiment, this gas turbine blade or compressor blade or turbine blade is a component of an aircraft engine. The device has a supporting device to hold the gas turbine blade or a sheet of the gas turbine blade, as well as a lowering device for lowering the blade or blade sheet, a container to accommodate powder and/or for accommodating the blade or blade sheet, as well as a heater and a radiation source.

The heater has an induction coil or is embodied as an induction coil.

The radiation source can, for example, be a laser or an electron-beam source. In an advantageous embodiment, the holding device can be coupled to the lower device or be placed or fixed on the lowering device.

According to an advantageous embodiment, provision is made that the invention-specific device is used to carry out the invention-specific procedure.

Preferably the device has a control device to control an automated manufacture for repair of the blades for gas turbines. Provision can be made that by means of this control device, an invention-specific procedure is controlled, and in particular is automatically controlled.

In an advantageous embodiment, the induction coil is in the container, whereby from the coil wires exit from the container for a power supply. Preferably the coil is securely placed vis-à-vis and/or on the container. In an especially advantageous embodiment, in the container a protective gas atmosphere or a vacuum is found, especially in the upper area of the container.

Additionally, a procedure is especially proposed for manufacture or repair of blades for gas turbines. According to it, provision is made that at least one section of the blade or of the sheet of this blade is generatively produced in layered fashion. In particular, for this purpose, initially a base body of a blade is applied and this base body is fixed in a holding device, especially by clamping. For example, the base body can be a blade already produced—generatively for example, or by some other means—or blade sheet. Provision can also be made that the base body—especially in the case of a repair—matches a blade reduced by a part cut off. Provision can be made that the base body be an already partially manufactured or re-manufactured blade, at least a section of which is already produced by means of an invention-specific procedure. Additionally, provision is made according to the invention-specific procedure, that a powder layer is applied to a pre-determined section of the base body. Additionally, the base body, or a section of the base body is heated in locally limited fashion to a temperature that is greater than a pre-determined minimum temperature. For example, provision can be made that the base body or a section of the base body can be inductively heated to a temperature that is greater than 500° C., preferably greater than 700° C., preferably greater than 850° C., preferably greater than 900° C., preferably greater than 950° C. For example, provision can be made that the base body or a section of the base body can be heated to circa 1000° C. or greater. Additionally, according to the invention-specific procedure, the base body or the powder layer alluded to, or the area with the powder layer covering the pre-determined section of the base body or this section, can be irradiated for local fusing of the powder layer with the base body.

BRIEF DESCRIPTION OF THE DRAWINGS

In what follows, using the figures, an embodiment example of the invention shall be explained in greater detail, and in the process it is to be noted that also other embodiment examples fall under the invention, so that the invention is not limited only to the embodiment example according to the figures. Shown are:

FIG. 1: a schematic view of an exemplary invention-specific device, whereby by means of this device an invention-specific procedure in particular can be carried out.

DETAILED DESCRIPTION

FIG. 1 shows an exemplary invention-specific device 1 for manufacture or repair of blades 10 or of blade sheets (i.e., also known as aerofoils) 10 or of blade tips for turbines or compressors of aircraft engines.

The device 1 has a holding device 12 for the base body or for the blade 10. Especially with the implementation of an exemplary invention-specific procedure, the blade 10 is held in the holding device 12. The holding device 12 can for example be a clamping device. Thus, especial provision can be made that the component 10 or the blade 10 be clamped in the holding device 12.

The device shown in FIG. 1 additionally has a lowerable unit or lowering device 14. This lowering device 14 serves to permit the component or the blade 10 to be lowered for layered formation, and especially staged by a measure appropriate to the particular layer thickness 22 of the layers to be produced as part of the generative assembly.

Provision can be made that the holding device 11 forms a common unit with the lowering device 14 or that the holding device 12 is mounted on the lowering device 14. Special provision is made that the holding device 12 is on the lowerable unit or lowering device 14 in such a way that a uniformly thick powder layer can be applied, particularly to assemble the component or the blade 10 or the blade sheet.

Additionally, device 1 has a heater 16 that is embodied as an HF coil or as an induction coil 16. The advantage of such an HF coil or induction coil 16 is that by means of it, essentially limited heating or warming can take place. By this means, the component or the blade 10 in the area of the powder layer, or the powder layer, can be inductively heated. Provision can be made that the coil 16 be placed either above the powder layer or in the powder 18. Special provision is made that the powder itself is not heated in the process and that the induction coil 16 does not heat the powder.

Additionally, the induction coil 16 can be heated indirectly in a susceptor not shown in FIG. 1, which in turn evenly heats the blade tip.

In the process, the base body or component 10 or blade 10 or blade sheet 10 can be provided in essence with locally limited heated while doing so within a few seconds to 1000° C. or 1080° C. Owing to radiation energy, such as laser beams or electron beams, the powder layer can be locally fused with the component or the blade 10.

For this purpose, a radiation source, not shown in FIG. 1, like a laser or an electron beam source, can be provided.

After a layer is generated in the manner cited previously, the component can be lowered using the lowering device 14 (especially by one layer thickness), with powder 18 again being applied, inductively heated, and fused by radiation energy. This procedure can be repeated until the target (final) geometry is achieved.

To be noted is that the device 1 has a container 17, in which—also at least—powder 18 is placed, which is also used to assemble the blade 10 or the component.

In the upper area in this container 17, a protective gas atmosphere 20 or a vacuum 20 can be provided. Especially with this, in an advantageous embodiment, provision is made that the coil 16 is provided in the transition area from the protective gas atmosphere or the vacuum to the powder 18.

The configuration according to the embodiment example has the advantage that heating can be deliberately done at the place at which the heat in question is needed, and this blade 10 is heated not over the entire blade 10, such as outward from the blade foot, so that bracing and/or warping or joint alterations take place (for example, especially reduction of the low-cycle-fatigue strength at the blade foot can be an undesired effect).

By connection of a generative procedure with a heater that is configured as an HF coil or as an induction coil 16, according to the embodiment example, a simple device can be produced for repair of a blade or of a blade sheet 10 of a turbine or of a compressor of a gas turbine engine. This configuration can even be developed to the extent that manufacture of the blades 10 can be automated. The danger of the blade 10 getting warped or of manufacturing imprecision or of joint damage, is considerably reduced compared to known embodiments.

The layer thickness can for example be between 10 μm and 200 μm, preferably between 20 μm and 100 μm, especially preferably circa 50 μm or circa 30 μm.

Provision can be made that the base body be heated by the induction coil to over 1000° C., so that between component 10 and the layer, no crack initiation is expected. With this the environment remains cold, so that no impairment to the facility or the component arises.

Provision can be made that the base body and/or the generatively produced layers are of high-melting-point single-crystal material. Provision is especially made that a tip repair, especially with high-melting-point single-crystal materials of the base body and/or layers, is automated, which is not possible according to the state of the art, as far as the applicant knows.

As the embodiment example especially shows, high-melting-point materials can be processed and an automated tip repair can be carried out.

The invention claimed is:

1. A method for manufacturing blades for gas turbines, wherein at least one section of a turbine blade is generatively produced in layers, the method comprising the following steps:
   providing a base body of a blade;
   fixing the base body in a holding device;
   forming a powder layer over a predetermined section of the base body;
   heating the predetermined section of the base body using locally limited direct inductive heating with an induction coil positioned within the powder layer to a temperature that is greater than a preset minimum temperature without significantly heating the powder layer; and
   irradiating, with a laser, a selected portion of the powder layer overlying the locally limited, heated predetermined section of the base body to locally fuse the selected portion of the powder layer to the underlying base body;
   whereby following irradiation with a laser, the fused powder of the selected portion of the powder layer that was overlying the predetermined section of the base body becomes a new layer of the base body.

2. A method according to claim 1, further comprising the step of:
   after the step of irradiating a selected portion of the powder layer, lowering the base body.

3. A method according to claim 2, further comprising the step of:
   after the step of lowering of the base body, forming a new powder layer over a new predetermined section of the new layer of the base body generated by the prior irradiation step.

4. A method according to claim 3, further comprising the step of:
   after the step of forming a new powder layer,
   heating the new predetermined section of the new layer of the base body generated by the prior irradiation step using locally limited direct inductive heating with an induction coil positioned within the powder layer to a temperature that is greater than a preset minimum temperature without significantly heating the powder layer; and
   irradiating, with a laser, a new selected portion of the new powder layer overlying the locally limited, heated new predetermined section of the new layer of the base body generated by the prior irradiation step to locally fuse the new selected portion of the new powder layer to the underlying new layer of the base body;
   whereby following irradiation, the fused powder of the new selected portion of the new powder layer that was overlying the new predetermined section of the new layer of the base body becomes a further new layer of the base body.

5. A method according to claim 1, wherein the step of heating the predetermined section of the base body is performed using one of an induction coil heater and a high frequency (HF) coil.

6. A method according to claim 1, further comprising the step of maintaining a special atmosphere in the region surrounding the selected portion of the powder layer during the irradiation step.

* * * * *